United States Patent [19]
Pigott et al.

[11] Patent Number: 5,388,533
[45] Date of Patent: Feb. 14, 1995

[54] PALLET AND COMPONENTS THEREOF

[76] Inventors: Brandon L. Pigott, 1017 Elmwood Ave., Wilmette, Ill. 60091; Schuyler F. Pigott, 1122 N. Patton St., Arlington Heights, Ill. 60004; Peter S. Pigott, 803 Elmwood Ave., Wilmette, Ill. 60091; Maurice J. Pigott, 591 Cherry St., Winnetka, Ill. 60093

[21] Appl. No.: 63,856

[22] Filed: May 19, 1993

Related U.S. Application Data

[63] Continuation-in-part of Ser. No. 7,372, Apr. 21, 1993, Pat. No. Des. 346,681, which is a continuation-in-part of Ser. No. 961,396, Oct. 15, 1992, Pat. No. 5,343,814, which is a continuation-in-part of Ser. No. 644,928, Jan. 23, 1991, Pat. No. 5,197,395, which is a continuation-in-part of Ser. No. 230,025, Aug. 9, 1988, Pat. No. 4,843,976.

[51] Int. Cl.$^6$ .................................... B65D 19/12
[52] U.S. Cl. ............................ 108/56.3; 108/56.1; 108/902
[58] Field of Search ............... 108/56.1, 56.3, 51.1, 108/901, 902

[56] References Cited

U.S. PATENT DOCUMENTS

| | | | |
|---|---|---|---|
| 2,918,241 | 12/1959 | Maher | 108/56.1 |
| 2,922,606 | 1/1960 | Glassman et al. | 108/56.1 |
| 4,604,014 | 8/1986 | Frano | 108/56.3 X |
| 4,799,433 | 1/1989 | Luft | 108/56.1 X |
| 5,197,396 | 3/1993 | Breezer et al. | 108/56.1 X |

FOREIGN PATENT DOCUMENTS 2101346  3/1972  France ................. 108/56.3

*Primary Examiner*—Jose V. Chen
*Attorney, Agent, or Firm*—Wallenstein, Wagner & Hattis, Ltd.

[57] ABSTRACT

A composite pallet (10) is disclosed that includes a wooden base (21), a wooden deck (11), a plurality of plastic sleeves (100) and a plurality of plastic connectors (80). The sleeves (100) fit into passageways (50) formed of channels (18, 28) and openings (19, 32) in the pallet (20). Each sleeve (100) has a cylindrical sleeve body (101) with a projecting lip (102) at one end. A plurality of tabs (103) a circumferentially spaced apart on the sleeve body (101).

11 Claims, 2 Drawing Sheets

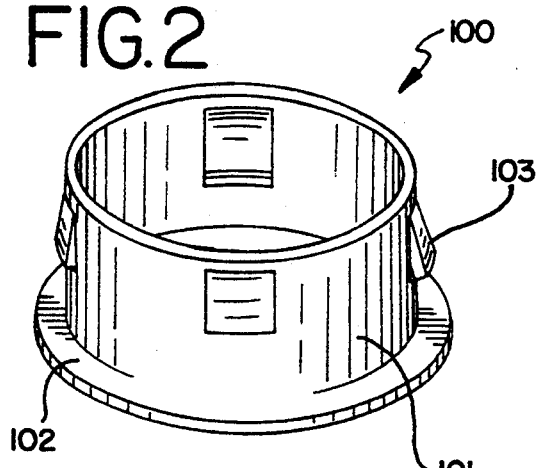
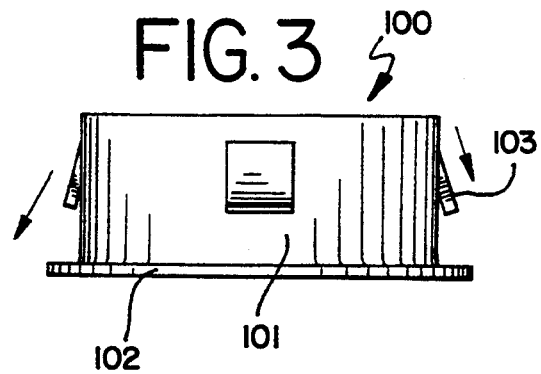
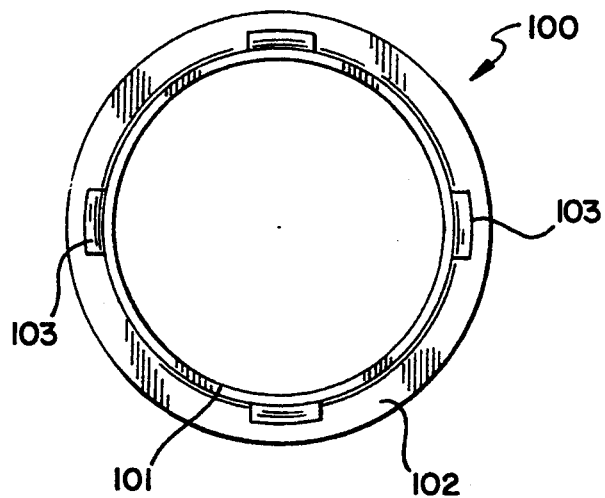
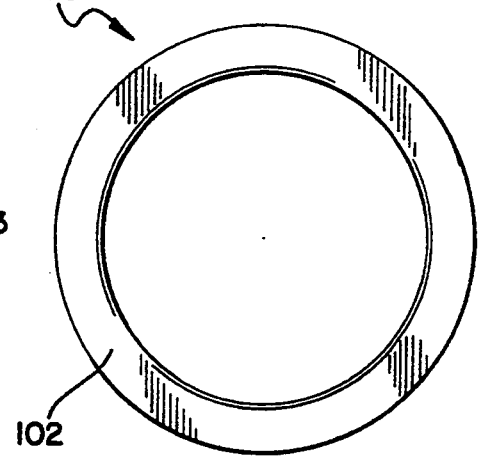
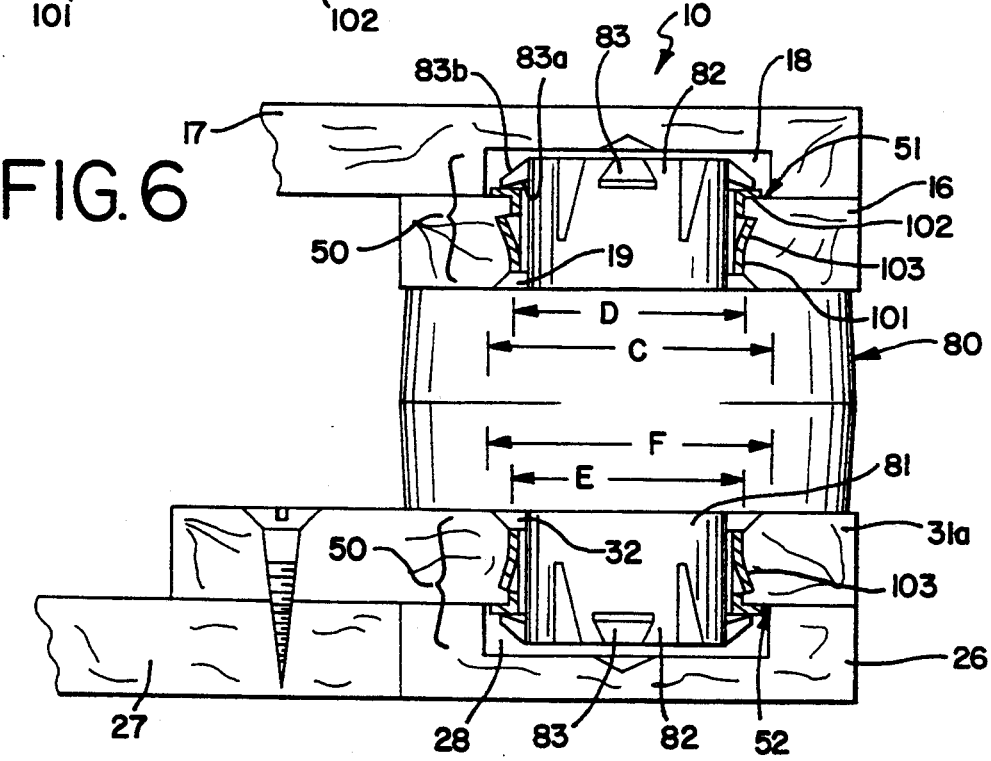

PALLET AND COMPONENTS THEREOF

REFERENCE TO RELATED APPLICATIONS

This is a continuation-in-part application of U.S. Ser. No. 29/007,372, filed Apr. 21, 1993 (Attorney File No. 432D026) for a PLASTIC PALLET WITH DECK ASSEMBLY, now U.S. Pat. No. Des. 346,681, which is a continuation-in-part application of U.S. Ser. No. 961,396, filed Oct. 15, 1992, now U.S. Pat. No. 5,343,814, for a PLASTIC PALLET WITH DECK ASSEMBLY, which is a continuation-in-part application of U.S. Ser. No. 644,928, filed Jan. 23, 1991, for a PLASTIC PALLET WITH DECK ASSEMBLY, now U.S. Pat. No. 5,197,395, issued Mar. 30, 1993, which is a continuation-in-part application of U.S. Ser. No. 230,025, filed Aug. 9, 1988, for a PLASTIC PALLET, now U.S. Pat. No. 4,843,976, issued Jul. 4, 1989.

TECHNICAL FIELD

The present invention relates to pallets for storing and transporting goods, and more particularly, to a pallet that comprises a base and a deck that integrate sleeves for permitting connection by a plurality of connectors. The pallet can be easily assembled for palletizing goods and easily disassembled for transportation and storage.

BACKGROUND PRIOR ART

It is customary to transport goods and to store goods on pallets. Palletized goods are maintained in a position above the flooring which can be very advantageous in areas where there is flooding or where the condition of the flooring is either rough or of concern. Standard pallets are particularly useful in materials handling because forklift equipment can maneuver the pallets by inserting their forklift tines into channels provided by the pallet. Typically, pallets are constructed of wood. In the past, wooden pallets have provided advantages of economy, simplicity and durability, principally because of the lack of other suitable materials. However, wooden pallets are extremely heavy and require costly hand labor in their fabrication.

In the past decades, disposable pallets have been proposed and, with the growth of the plastics industry, a wide variety of plastics have been investigated to determine their suitability for use in producing pallets. Plastic pallets can easily be molded and are stronger and lighter in weight than wooden pallets. They can also now be made with recyclable materials.

A recent plastic pallet that is light in weight, durable, capable of supporting heavy loads and is easy to manufacture and have a minimum number of parts that are preferably interchangeable are disclosed in U.S. Pat. No. 5,197,395 for a PLASTIC PALLET WITH DECK ASSEMBLY and in U.S. Pat. No. 4,843,976 for a PLASTIC PALLET. The pallets and connectors disclosed in these patents have proven to be highly successful. Improvements thereon are shown and disclosed in U.S. Ser. No. 961,396, filed Oct. 15, 1992 for A PLASTIC PALLET WITH DECK ASSEMBLY and U.S. Ser. No. 29/007,372, filed Apr. 21, 1993 (Attorney File No. 432D026) for A PLASTIC PALLET WITH DECK ASSEMBLY.

Prior attempts at composite pallets, meaning composed of both wood and plastic, have been costly and heavy. Accordingly, there has been a need for pallets of wood that have the light weight, versatility and ease of construction of plastic pallets.

SUMMARY OF THE INVENTION

The present invention comprises a pallet base that can be made of wood for use in combination with a second pallet base or, preferably, a pallet deck that can also be made of wood and a plurality of presently existing plastic connectors. The pallet base is interconnected to the second pallet base or deck by the connectors. Adaptors or sleeves are used to permit the connectors to work with the wooden decks and bases.

According to a primary aspect of the present invention, a load-bearing pallet is shown that includes four (4) primary components, namely, a base, a deck, a plurality of plastic sleeves and a plurality of connectors. The base is generally rectangular and has outer and inner surfaces and a plurality of spaced channels projecting inwardly from the inner surface thereof with a first diameter at least at the corners thereof. The deck is generally rectangular and has outer and inner surfaces and a plurality of spaced channels projecting inwardly from the inner surface thereof with a second diameter at least at the corners thereof.

A plurality of spacer members, such as blocks for the base and longitudinal support members for the deck, with openings having a third and fourth diameters respectively therein are disposed adjacent the inner surface of both the base and the deck and are positioned such that the openings are generally vertically aligned with the channels. The openings have a smaller diameter than the channels so as to form a ledge on the spacer member. A plurality of sleeves cooperate with each of the openings in the spacer members. Each sleeve has a generally cylindrical sleeve body with an outer lip projecting radially outwardly from an end of the body and at least one tab axially spaced from the lip projecting outwardly from the body.

The outer lip of each sleeve engages the ledge formed on either the block or the longitudinal support member and each sleeve has a plurality of circumferentially spaced tabs, each tab projecting outwardly from the body in a direction generally towards an outermost point of the lip so as to frictionally engage a side wall of the opening.

Finally, a plurality of connectors are received in the sleeves for cooperating with the sleeves and are adapted for interconnecting the base and the deck so as to form the completed pallet.

According to another aspect of the present invention, the base includes a pair of opposed side members, a pair of opposed end cross members, and at least one intermediate cross member disposed between and parallel to the end cross members. In addition, the deck includes as spacer members, a pair of side longitudinal support members, at least one intermediate longitudinal support member, and a plurality of substantially parallel transverse slats; the longitudinal support members have the slats fastened thereto. Acting as spacer members for the base, a plurality of blocks are disposed and attached adjacent the inner surface of the base.

Each connector includes a substantially hollow cylindrical central core having a plurality of tangs extending from opposite ends thereof and a plurality of spaced, integral spokes extending outwardly from the core between the tangs with a ring integral with the distal ends of the spokes. Each tang has a tapered barb adjacent each end thereof and the spokes and the ring define planes that engage adjacent spacer members.

Other advantages and aspects of the present invention will become apparent upon reading the following description of the drawings and the detailed description of the invention.

BRIEF DESCRIPTION OF DRAWINGS

In order that the present invention may be understood, it will now be described by way of example, with reference to the accompanying drawings in which:

FIG. 2 is a perspective top view of a sleeve made in accordance with the teachings of the present invention;

FIG. 3 is a side elevation view of the sleeve;

FIG. 4 is a top plan view of the sleeve;

FIG. 5 is a bottom plan view of the sleeve; and,

FIG. 6 is a sectional view through the pallet.

DETAILED DESCRIPTION

Figure 1:
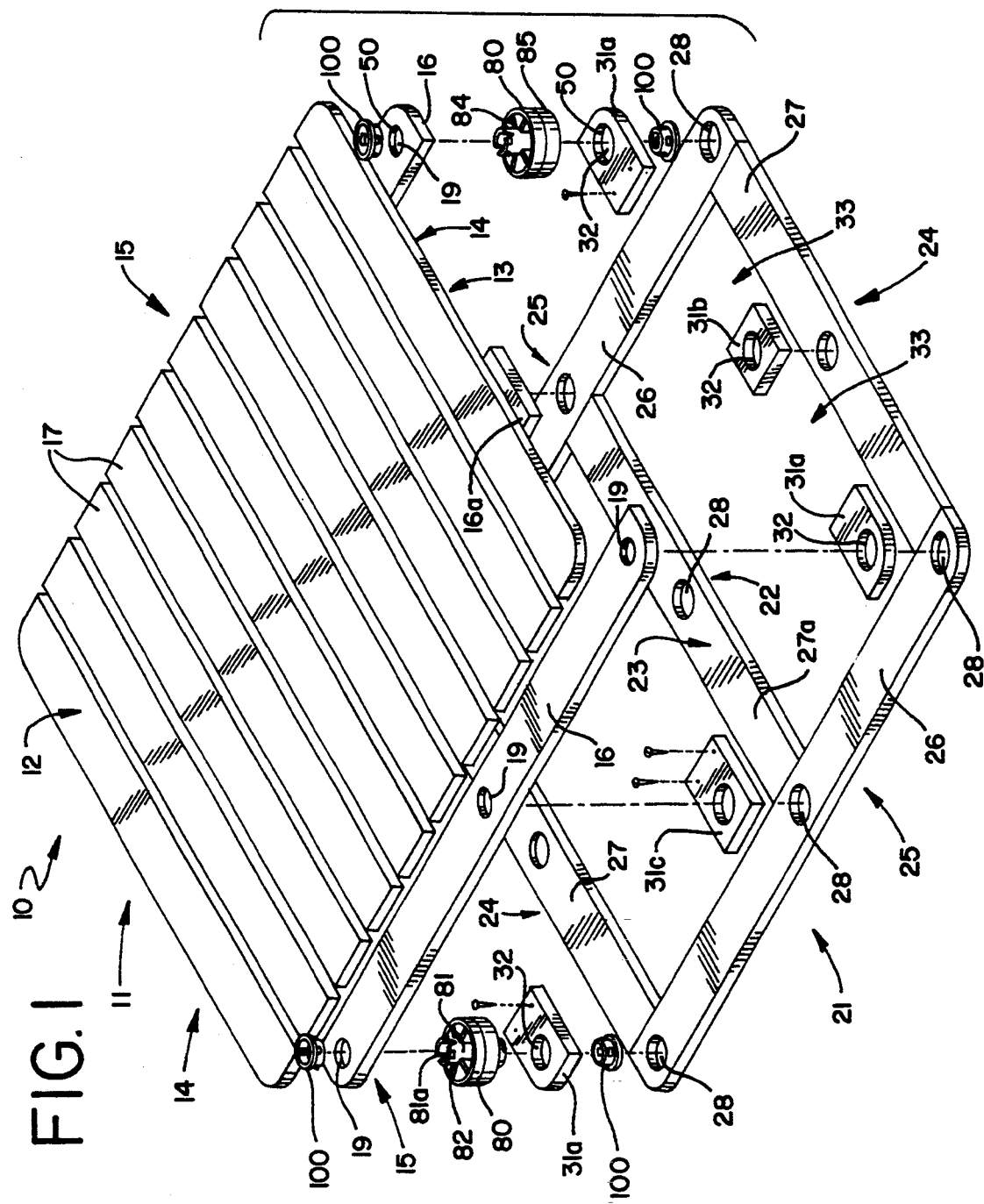
FIG. 1 is an exploded perspective top view of the pallet assembly made in accordance with the teachings of the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

The load-bearing pallet, generally designated by the reference number 10, is shown in FIG. 1. It includes a generally rectangular deck 11 and base 21. The deck 11 has opposed ends 14, opposed sides 15, an inner surface 13 facing the base 21, and outer surface 12 for supporting the palletized goods. Similarly, the base 21 has opposed ends 24, opposed sides 25, an inner surface 23 facing the deck 11, and an outer surface 22 for contacting the ground or flooring.

A plurality of spaced passageways 50 are provided in the base 21 and the deck 11 that projecting inwardly from the inner surfaces 13,23 thereof. The base 21 and deck 11 are held in place by a plurality of sleeves 100 and connectors 80 that cooperate with the passageways 50.

The base 21 includes a pair of opposed side members 26, a pair of opposed end cross members 27, and at least one intermediate cross member 27a disposed between and parallel to the end cross members. The side and cross members are connected by conventional fastener means. Generally, at the corners, at locations intermediate the corners, and at a median position along the intermediate cross member of the base 21, channels 28 are provided. These channels 28 form part of the previously noted passageways 50 in the base.

The deck 11 includes a pair of side longitudinal support members 16, at least one intermediate longitudinal support member 16a, and a plurality of substantially parallel transverse slats 17. The slats 17 are preferably fastened by conventional means to outer surface of the longitudinal support members 16, 16a. Shown in the cross-section of FIG. 6, generally, at the ends and at locations intermediate the ends of the longitudinal support members 16, 16a of the deck 11, openings 19 are provided. Channels 18 are provided in the transverse slats 17 (FIG. 6) adjacent with and vertically aligned with the openings 19. Together, these channels 18 and openings 19 form the passageways 50 in the deck 11 as previously noted.

The channel 18 projects inwardly from the inner surface of the slat 17. Preferably, this channel 18 is a bored out cylindrical portion and does not pass completely through the slat. The channels 18 have a diameter C. The cylindrical openings 19 in the longitudinal support members 16,16a have a diameter D, which is less than diameter C of the channels 18, and are positioned adjacent the channels. Because the channel 18 diameter C is greater than the opening 19 diameter D, an internal ledge 51 is formed in the passageway 50. Specifically, the ledge 51 is formed on outer surface of the longitudinal support member 16,16a adjacent the opening 19.

Spacer members 31 are positioned adjacent the inner surface of the cross members 27,27a and side members 26 of the base 21. These spacers 31 are generally rectangular blocks, namely corner blocks 31a, intermediate blocks 31b, and side blocks 31c. Pallet openings 33 are thus formed at the ends 14, 24 of the pallet 10 between the blocks 31 and longitudinal support members 16. These openings 33 receive the tines from a forklift.

In a similar manner and shown in the cross-section of FIG. 6, generally, openings 32 are provided in the blocks 31 adjacent with and vertically aligned with the channels 28 formed in the cross and side members 26,27,27a. Together, these channels 28 and openings 32 form the passageways 50 in the base 21 as previously noted.

A passageway 50 in the base is also shown in cross-section in FIG. 6. The channel 28 projects inwardly from the inner surface of the side member 26 or cross member 27,27a. Preferably, this channel 28 is a bored out cylindrical portion and does not pass completely through the member. The channels 28 have a diameter F. The cylindrical openings 32 in the blocks 31 have a diameter E, which is less than diameter F of the channels 28, and are positioned adjacent the channels. Because the channel 28 diameter F is greater than the opening 32 diameter E, an internal ledge 52 is formed in the passageway 50. Specifically, the ledge 52 is formed on the outer surface of the block 31a,31b,31c adjacent the opening 32.

In practice, for ease of construction, the diameter E is the same as the diameter C and the diameter F is the same as the diameter D.

The base 21 and the deck 11 are interconnected by a plurality of connectors 80 received in the sleeves 100 positioned in each passageway 50. The details of these connectors are shown and claimed in U.S. Pat. No. 4,843,976, issued Jul. 4, 1989, entitled PLASTIC PALLET, and incorporated herein by reference.

Generally, each connector 80 includes a substantially hollow cylindrical central core 81 which has a plurality of circumferentially spaced slots 81a extending inwardly from opposite ends thereof which produce tangs 82. Each tang 82 is identical in construction and has a tapered barb 83 formed on the outer surface adjacent the free end. Each barb 83 has a flat lower surface 83a which extends perpendicular to the axis of the core and has a tapered surface 83b extending from the outer edge to define a ramp (See FIG. 6).

The central core also has an internal force absorbing flange (not shown) located at the center of the core and equally spaced from opposite ends. Moreover, each tang has an inner integral reinforcing rib (not shown)

which extends from the flange to the free end and is aligned with the barb.

The connector 80 also has a plurality of spaced, integral spokes 84 extending radially outward from the core 81 between the tangs 82 with a ring 85 integral with the distal ends of the spokes. This ring 85 surrounds the core 81; the bottom and top edges of the spokes 84 and the ring 85 define planes that engage the adjacent base or deck.

Noted previously and shown in FIGS. 1 and 6, a plurality of sleeves 100 cooperate with the passageways 50, and more particularly with the openings 19, 32 and the connectors 80. Specifically, the pallet incorporates a plurality of sleeves 100 that have a generally cylindrical sleeve body 101 with a generally perpendicular outer lip 102 projecting radially outwardly from an end of the body. Tabs 103 are axially spaced from this lip 102 and also project outwardly from the body. Each tab 103 is capable of deflecting inwardly and has memory. Thus, the tabs 103 can be forced or moved inwardly by pressure and can move outwardly or back to its original position when the pressure or force is released.

It is the outer lip 102 of each sleeve 100 that engages the internal ledges 51,52 formed within each of the passageways 50. The tabs 103 project outwardly from the sleeve body 101 in a direction generally towards an outermost point of the lip 102 (See Arrow in FIG. 3) and are adapted to frictionally engage a side wall of the opening 19,32.

To assemble a pallet of the present construction, a sleeve is put into each passageway. More particularly, with respect to the deck, prior to connecting the longitudinal support members with openings to the transverse slats with channels, the sleeves are force fitted into the openings in the longitudinal members. The orientation of the sleeves is shown in FIGS. 1 and 6. The end of the body of the sleeve opposite the outer lip is aligned with the opening and an axial force is applied to the sleeve. The tabs deflect inwardly and grip the inner wall of the opening. The axial force is applied until the outer lip abuts the edge of the opening or the ledge. Once the sleeve is in place, the longitudinal support members are secured by conventional means, such as nails or wood screws, to the transverse slats. The orientation of the sleeves, channels, openings, supports and slats is shown in FIG. 1.

Similarly, with respect to the base, prior to connecting the blocks with openings to the side and cross members with channels, the sleeves are force fitted into the openings in the blocks. Again, the orientation of the sleeves in shown in FIGS. 1 and 6. The end of the body of the sleeve opposite the outer lip is aligned with the opening and an axial force is applied to the sleeve. The tabs deflect inwardly and grip the inner wall of the opening. The axial force is applied until the outer lip abuts the edge of the opening or ledge. Once the sleeve is in place, the blocks are secured by conventional means, such as nails or wood screws, to the cross and side members. The orientation of the sleeves, channels, openings, blocks and side and cross members is shown in FIG. 1.

Once the sleeves are positioned in the passageways formed by the aligned openings and channels, the base or the deck is placed on the ground or floor with the outer surface thereof contacting the ground or floor. The connectors are then put into the passageways by aligning an end of each connector with a passageway and applying an axial force to the connector in the direction towards the passageway. The connector will snap into the passageway such that the barbs on the tangs abut and contact the outer lip of the sleeve.

The mating base or deck is aligned with and placed over the deck or base on the floor such that their inner surfaces face one another and the inserted connectors are just below the passageways of the mating component. A downward force is applied to the upper component, base or deck, and the exposed, other ends of the connectors are snapped into the empty passageways such that the barbs on the tangs abut and contact the outer lips of the sleeves.

To remove a connector in order to replace it or to separate the base and deck, a removal tool may be employed. The construction and use of this tool are discussed and shown in U.S. Pat. No. 4,843,976, issued Jul. 4, 1989 and incorporated herein by reference.

While a specific embodiment has been illustrated and described, numerous modifications come to mind without significantly departing from the spirit of the invention and the scope of protection is only limited by the scope of the accompanying claims.

We claim:

1. A load-bearing pallet comprising:
   a generally rectangular base having outer and inner surfaces and a plurality of spaced first channels projecting inwardly from said inner surface with a first diameter at least at the corners thereof;
   a generally rectangular deck having outer and inner surfaces and a plurality of spaced second channels projecting inwardly from said inner surface with a second diameter at least at the corners thereof;
   a plurality of spacer members with openings having a third diameter therein disposed adjacent said inner surface of said base and adjacent said inner surface of said deck positioned such that said openings are generally vertically aligned with said channels, said openings having a smaller diameter than said first channels and said second channels so as to form a ledge on said spacer member;
   a plurality of sleeves having a generally cylindrical sleeve body with an outer lip projecting radially outwardly from an end of said body and at least one tab axially spaced from said lip projecting outwardly from said body,
   each said sleeve cooperating with each said opening in said spaced members; and,
   a plurality of connectors received in said sleeves cooperating with said sleeves adapted for interconnecting said base and said deck.

2. The load-bearing pallet of claim 1, wherein said base includes a pair of opposed side members, a pair of opposed end cross members, and at least one intermediate cross member disposed between and parallel said end cross members.

3. The load-bearing pallet of claim 1, wherein said deck includes a pair of side longitudinal support members, at least one intermediate longitudinal support member, and a plurality of substantially parallel transverse slats, said longitudinal support members having said slats fastened thereto and being said spacer members disposed adjacent said inner surface of said base.

4. The load-bearing pallet of claim 1, wherein said spacer members disposed adjacent said inner surface of said base are generally rectangular blocks.

5. The load-bearing pallet of claim 1, wherein each said connector includes a substantially hollow cylindrical central core having a plurality of tangs extending from opposite ends thereof and a plurality of spaced, integral spokes extending outwardly from said core between said tangs with a ring integral with the distal ends of said spokes, each said tang having a tapered barb adjacent each end thereof and said spokes and said ring defining planes that engage adjacent spacer members.

6. The load-bearing pallet of claim 1, wherein said outer lip of each said sleeve engages said ledge formed on said spacer member and each said sleeve has a plurality of circumferentially spaced tabs, each said tab projecting outwardly from said body in a direction generally towards an outermost point of said lip and being adapted to frictionally engage a side wall of said opening.

7. A load-bearing pallet comprising:
a generally rectangular base including a pair of opposed side members, a pair of opposed end cross members, and at least one intermediate cross member disposed between and parallel said end cross member, said base having outer and inner surfaces and a plurality of spaced first channels projecting inwardly from said inner surface with a first diameter at least at the corners of said base;
a generally rectangular deck including a pair of side longitudinal support members, at least one intermediate longitudinal support member, and a plurality of substantially parallel transverse slats, said longitudinal support members having said slats fastened thereto, said deck having outer and inner surfaces and a plurality of spaced second channels projecting inwardly from the inner surface of said slats with a second diameter at least at the corners of said base, and having openings in said longitudinal support members with a third diameter therein disposed adjacent said inner surface of said slats positioned such that said openings are generally vertically aligned with said second channels, said openings having a smaller diameter than said second channels so as to form a ledge on said longitudinal support member;
a plurality of generally rectangular blocks with openings having a fourth diameter therein disposed adjacent said inner surface of said base positioned such that said openings are generally vertically aligned with said first channels, said openings having a smaller diameter than said first channels so as to form a ledge on said block;
a plurality of sleeves having a generally cylindrical sleeve body with an outer lip projecting radially outwardly from an end of said body and at least one tab axially spaced from said lip projecting outwardly from said body,
each said sleeve cooperating with each said opening in said spacer members; and,
a plurality of connectors received in said sleeves cooperating with said sleeves adapted for interconnecting said base and said deck, each said connector including a substantially hollow cylindrical central core having a plurality of tangs extending from opposite ends thereof and a plurality of spaced, integral spokes extending outwardly from said core between said tangs with a ring integral with the distal ends of said spokes, each said tang having a tapered barb adjacent each end thereof and said spokes and said ring defining planes that engage at one end said longitudinal support member and at the other end said block.

8. The load-bearing pallet of claim 7, wherein said outer lip of each said sleeve engages said ledge formed on either said longitudinal support member or said block and each said sleeve has a plurality of circumferentially spaced tabs, each said tab projecting outwardly from said body in a direction generally towards an outermost point of said lip and being adapted to frictionally engage a side wall of said opening.

9. A sleeve for use in combination with a pallet that has a base and a deck interconnected by a plurality of connectors, the base and the deck having an inner surface and an outer surface and a plurality of spaced passageways projecting inwardly from the inner surface at least at the corners thereof for receiving an end of a connector, the passageways having a first inner portion with first internal wall having a first diameter and a second outer portion with a second internal wall having a second diameter greater than the inner diameter resulting in the forming of an internal ledge, each end of the connector having outward projections adjacent thereof, comprising:
a generally cylindrical sleeve body with an outer lip projecting radially outwardly from an end of said body and at least one tab axially spaced from said lip projecting outwardly from said body,
each sleeve being adapted to cooperate with each of the passageways and the connectors, each tab deflecting inwardly and frictionally engaging the first internal wall to secure the sleeve in the passageway.

10. The sleeve of claim 9, wherein said outer lip of the sleeve engages said internal ledge formed in said passageway and each the sleeve has a plurality of circumferentially spaced tabs, each said tab projecting outwardly from said body in a direction generally towards an outermost point of said lip and being adapted to frictionally engage a side wall of the passageway.

11. The sleeve of claim 10, wherein each connector includes a substantially hollow cylindrical central core with a plurality of tangs extending from opposite ends thereof adapted to fit in the passageways and a plurality of spaced, integral spokes extending outwardly from the core between the tangs with a ring integral with the distal ends of the spokes, each tang having a tapered barb adjacent each end thereof and the spokes and the ring defining planes that engage adjacent either the inner surface of the base or the inner surface of the deck.

* * * * *